United States Patent [19]

Krull

[11] 4,206,823
[45] Jun. 10, 1980

[54] WEIGHING APPARATUS

[75] Inventor: Maynard J. Krull, Andover, Mass.

[73] Assignee: Davis & Furber Machine Company, North Andover, Mass.

[21] Appl. No.: 900,330

[22] Filed: Apr. 26, 1978

[51] Int. Cl.² ............................................. G01G 11/08
[52] U.S. Cl. ........................................ 177/121; 19/240; 222/55
[58] Field of Search ............... 177/121, 119, 116, 16; 222/56, 55; 19/240, 105

[56] References Cited

U.S. PATENT DOCUMENTS

| 1,883,017 | 10/1932 | Sholtz | 177/16 X |
| 3,132,709 | 5/1964 | Lytton | 177/120 X |
| 3,802,522 | 4/1974 | Thompson | 177/121 |
| 4,133,455 | 1/1979 | Moser | 222/55 X |

FOREIGN PATENT DOCUMENTS 2506061  9/1975  Fed. Rep. of Germany ............ 19/240

Primary Examiner—Joseph W. Hartary
Attorney, Agent, or Firm—Thompson, Birch, Gauthier & Samuels

[57] ABSTRACT

This invention relates generally to textile carding machines, and is concerned in particular with an apparatus for weighing a condensed fiber lap feeding through a pair of compressor rolls to a pair of feeding rolls in a carding machine.

4 Claims, 4 Drawing Figures

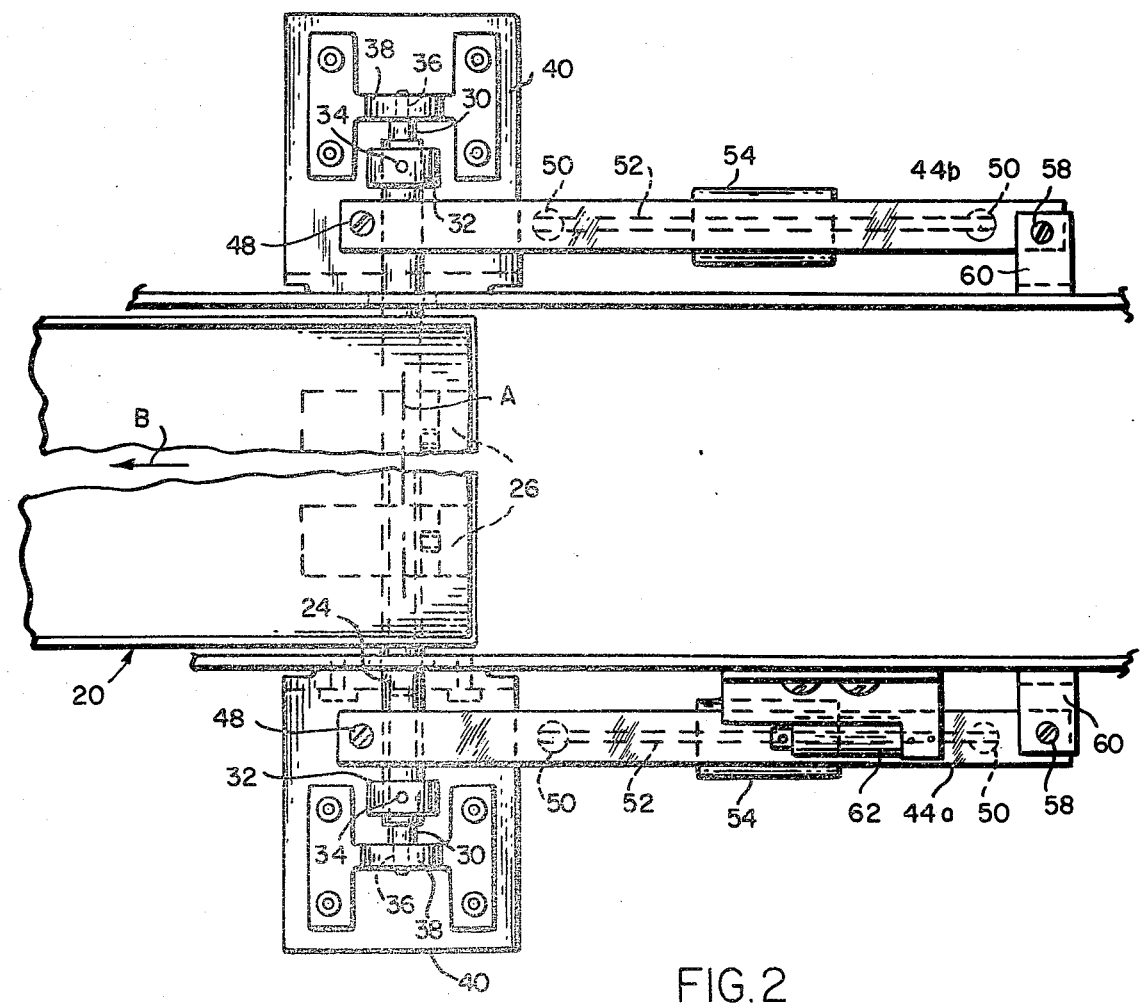
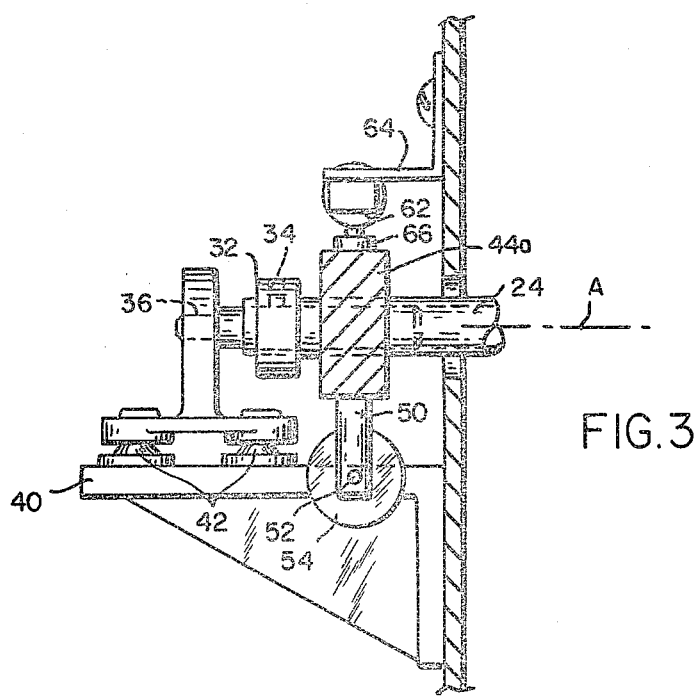
FIG.2
FIG.3

WEIGHING APPARATUS

BACKGROUND OF PRIOR ART

The importance of accurately monitoring and controlling the flow of fibers being fed to a carding machine is well recognized by those skilled in the art. A number of less than satisfactory attempts have been made at providing devices capable of performing this important function. Many of these devices attempt to measure flow rate indirectly as a function of the ability of the fiber condition to absorb or reflect either sound, light or isotropic radiation. The principal problem with such devices, however, is that the absorption capabilities of fibers varies widely, depending for example on fiber type (nylon, polyester, wool, etc.), the content of fiber blends, fiber lustre or colors, the application of emulsion, tints or anti-stats, etc. Thus, such devices require frequent recalibration, with attendant flow rate inaccuracies during the continuing operation.

Another known device measures the nip pressure exerted by a pair of rolls acting on the fiber flow. However, the accuracy of this type of device is compromised whenever randomly distributed lumps of fibers pass between the rolls, causing deceptive pressure increases which are not truly representative of the total fiber flow.

BRIEF SUMMARY OF INVENTION

The present invention avoids the above-mentioned problems by continuously weighing the fibers being fed to the carding machine.

In a preferred embodiment to be hereinafter described in greater detail, the fibers are condensed by compressor rolls and then conveyed over a chute to the card feeding rolls. The chute is mounted for movement in response to weight variations of the fibers being conveyed thereon. Chute movement is monitored by a control device which generates an electrical signal representative of the fiber weight variations. The electrical signal may be used in a variety of ways, most advantageously for example to adjust the operating speed of the card feed rolls and/or the compressor rolls.

By directly measuring the weight of fiber flow to the card feeding rolls, variations in fiber types, color, blends and additives can be ignored, thereby avoiding any necessity of recalibrating the device each time a different material is processed through the card.

BRIEF DESCRIPTION OF DRAWINGS

FIG. 2 is a partial horizontal plan view of the weighing apparatus, on lines 2—2 of FIG. 1 with the compressor rolls removed;

FIG. 3 is an end view of the apparatus looking in the direction of lines 3—3 in FIG. 1.

DETAILED DESCRIPTION OF INVENTION

Figure 1:
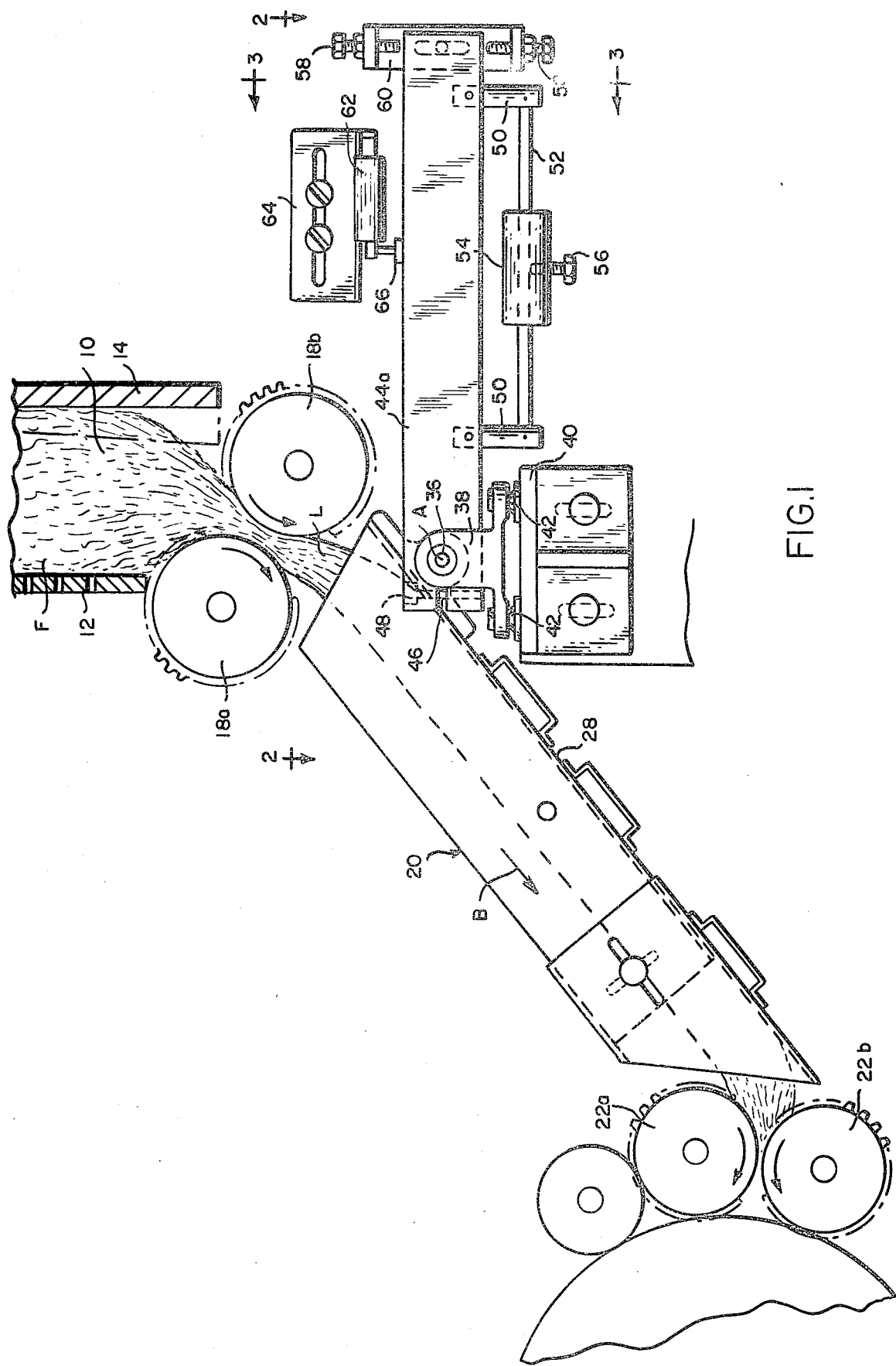
FIG. 1 is a view in side elevation of a preferred embodiment of a weighing apparatus in accordance with the present invention.
Figure 4:
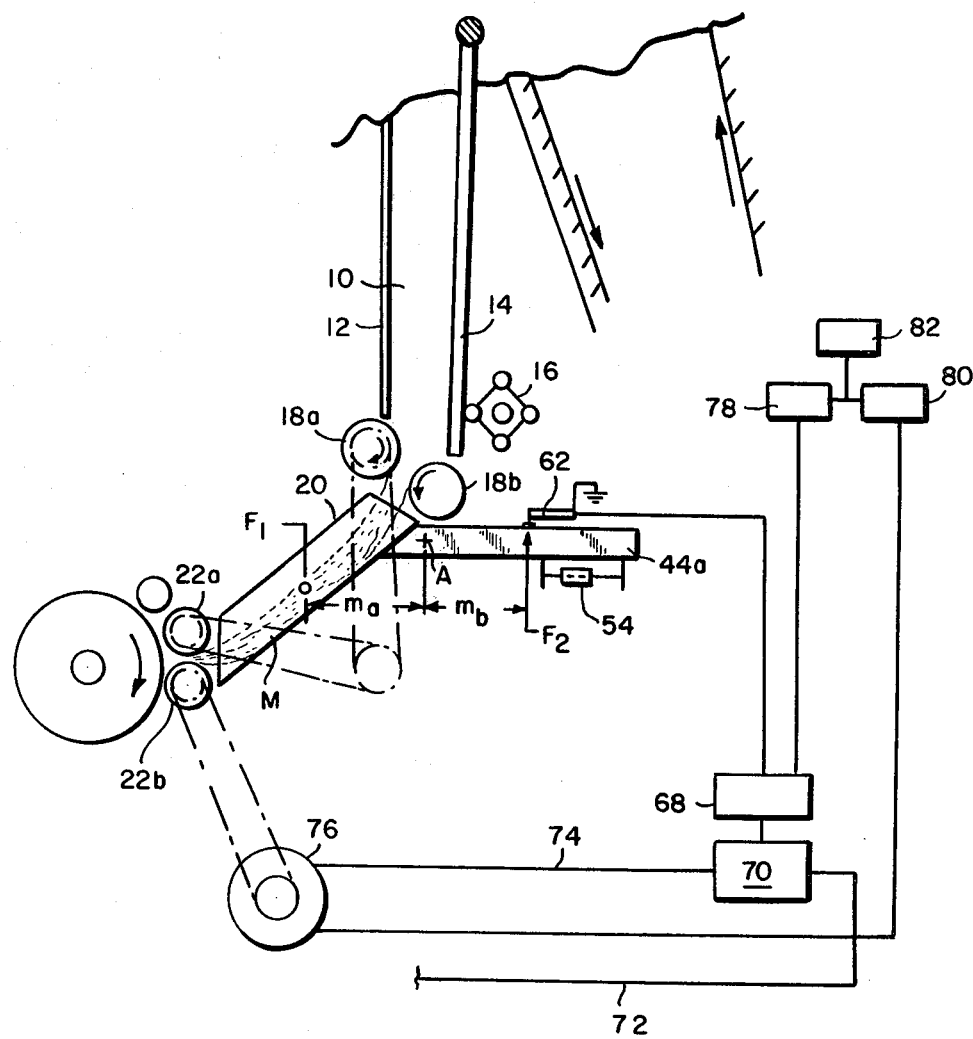
FIG. 4 is a schematic illustration of the apparatus and its electrical connection to other associated controls and components.

Referring now to the drawings, the bottom or delivery end of a feeder chamber 10 is shown comprised partially of a perforated front panel 12 and a rear panel 14 which is pivotally reciprocated in any known manner, for example by the drive wheel 16 shown in FIG. 4.

A pair of compressor rolls 18a, 18b are located at the bottom of chamber 10. Fibers "F" descend to the bottom of chamber 10 where they are compressed by rolls 18a, 18b into a condensed fiber lap "L" which is conveyed along a conveying means such as the chute generally indicated at 20 to the card feed rolls 22a, 22b. The card feeding rolls are mechanically interconnected by gears, as are the compressor rolls. These rolls are driven by a conventional system of chains and sprockets, as depicted in FIG. 4.

Chute 20 extends across the width of the compressor rolls 18a, 18b and the card feeding rolls 22a, 22b. The inclination of the chute is such that the condensed fiber lap L proceeds smoothly thereover with the assistance of gravity.

A tubular shaft 24 is fixed as by brackets 26 or any other convenient means to the bottom 28 of the chute 20. Cylindrical pins or studs 30 are received in the ends of shaft 24 and are held in place by collars 32 and screws 34. As shown, the studs 30 have reduced diameter ends 36 journalled in pivot supports 38. It will be understood, however, that the shaft ends can be provided with any one of a number of other shapes designed to provide pivotal motion. The pivot supports 38 are in turn secured to underlying fixed brackets 40, with resilient snubbing pads 42 located therebetween. It will thus be seen that the chute 20 is mounted for pivotal movement about an axis "A" which extends in a direction transverse to the direction "B" of fiber movement towards the feeding rolls 22a, 22b.

Arms 44a, 44b are divided at one end as at 46 and clamped by means of screws 48 onto the tubular shaft 24. The arms 44a, 44b are thus fixed relative to the chute 20 and are pivotally movable therewith about axis "A".

Arms 44a, 44b have depending studs 50 bridged by shafts 52 carrying slidable weights 54 which may be releasably fixed in a given position by means of screws 56. By properly adjusting the position of weights 54 along shafts 52, the weight of the empty chute 20 can be counterbalanced precisely. Pivotal movement of the arms 44a, 44b is maintained within adjustable limits by threaded studs 58 carried on fixed brackets 60.

A control means which preferably comprises a load beam transducer 62 is supported on another bracket 64 overlying the arm 44a. Transducer 62 may be of any commercially available type, for example the LBP1 transducer manufactured by BLH Electronics of Waltham, Mass., U.S.A. The transducer 62 has a contact button 66 acted upon by the arm 44a.

As the fiber lap L is fed onto the chute bottom 28 from the compressor rolls 18a, 18b, the fiber weight causes the chute 20 and the arms 44a, 44b to pivot about axis A. This depresses the contact button 66 of transducer 62 which generates an electrical control signal.

The application of the load beam transducer 62 as a weight measurement device on a mass moving along a pivotal chute 20 offers particular advantages. The load beam transducer is sensitive not only to the entire mass, but also to changes in the distribution of the mass as it acts upon the effective moment arm. As the flow of compressed fiber lap F exerts a force on the chute 20, the arm 44a acts upon the load beam transducer with an equal and opposite force. From any pre-set flow rate, the load beam transducer will measure and signal any change in weight of the fiber lap. This direct weight measurement signal is electronically processed at 68, and fed to an SCR-DC controller 70. Controller 70 also receives a reference signal 72 from the card drive. The output signal 74 of controller 70 controls the speed of the feeding roll drive motor 76.

This results in a regulated flow of fiber to an even product (K) of mass (M) times velocity (V), which can be expressed as $M \times V = K$.

As illustrated in FIG. 4, mass (M) exerts a force ($F_2$) that acts on the load beam transducer by the moment arm ($m_b$). This force is equal and opposite to the product of the fiber mass concentrated at a point ($F_1$) acting on its moment arm ($m_a$). As changes in weight or changes in the longitudinal mass moment occur, both the force ($F_1$) and the moment arm ($m_a$) will change depending on the point of concentration. The product of $F_1 \times m_a$ is equalized by $F_2 \times m_b$. As $m_b$ is constant, the force ($F_2$) is the controlling signal of measurement, and can be expressed as:

$$\frac{F_1 \times m_a}{m_b} = F_2.$$

The controlling signal of force ($F_2$) is digitally displayed at 78 in Lbs/Ft. This signal is electronically processed through the SCR-DC motor controller 70 where it is combined with a speed signal and the reference signal 72 to control the motor 76. The motor speed is digitally displayed in F.P.M. of the feed roll at 80. As a result, the product of Lbs/Ft times F.P.M. equals the production rate of the machine which is digitally displayed in Lbs/Hr. at 82, and allows production rates to be predetermined.

Although a system has been illustrated for mechanically couterbalancing the chute 20 by means of adjustable weights 54 on the arms 44a, 44b, it will be understood that "counterbalancing" can be achieved electronically. Also, the contact button 66 of the transducer 62 can be acted upon directly by the chute 20.

I claim:

1. Apparatus for controlling the rate at which fibrous material is withdrawn from a supply chamber and fed to a carding machine, comprising:
    a pair of compressor rolls located adjacent to an outlet of the supply chamber;
    a pair of feeding rolls adjacent to the entry end of the carding machine, said feeding rolls being located at a level beneath that of said compressor rolls and being vertically offset therefrom;
    a downwardly inclined chute extending between said compressor rolls and said feeding rolls;
    drive means for rotatably driving said compressor rolls and said feeding rolls, said compressor rolls being arranged to form fibrous material exiting from the outlet of the supply chamber into a compressed fiber lap which is directed downwardly on said chute to said feeding rolls, said feeding rolls being arranged to direct said fiber lap into the carding machine;
    means adjacent to the upper end of said chute for supporting said chute for pivotal movement about an axis extending transversely in relation to the path of movement of said fiber lap;
    sensing means responsive to pivotal movement of said chute for generating an electrical control signal representative of the weight of the fiber lap being conveyed on said chute; and,
    control means responsive to said control signal for varying the speed of said drive means in order to maintain a predetermined feed rate for the fiber lap exiting from said feed rolls.

2. The apparatus of claim 1 further comprising an arm fixed relative to said chute for pivotal movement therewith about said axis, said sensing means being acted upon by said arm.

3. The apparatus of claim 1 wherein said sensing means comprises a load beam transducer.

4. The apparatus of claim 1 wherein both of said sets of rolls are mechanically interconnected and driven by a common variable speed drive.

* * * * *